US012799902B2

(12) United States Patent
Indrich et al.

(10) Patent No.: US 12,799,902 B2
(45) Date of Patent: Nov. 17, 2026

(54) FUEL INJECTOR OF AN INTERNAL COMBUSTION ENGINE AND INTERNAL COMBUSTION ENGINE

(71) Applicant: MAN Energy Solutions SE, Augsburg (DE)

(72) Inventors: Maximilian Indrich, Bobingen (DE); Josef Ippy, Aichach (DE)

(73) Assignee: EVERLLENCE SE, Augsburg (DE)

( * ) Notice: Subject to any disclaimer, the term of this patent is extended or adjusted under 35 U.S.C. 154(b) by 0 days.

(21) Appl. No.: 19/226,712

(22) Filed: Jun. 3, 2025

(65) Prior Publication Data

US 2025/0382925 A1 Dec. 18, 2025

(30) Foreign Application Priority Data

Jun. 12, 2024 (DE) ..................... 10 2024 116 425.5

(51) Int. Cl.

*F02M 43/00* (2006.01)
*F02D 19/06* (2006.01)
*F02M 43/04* (2006.01)

(52) U.S. Cl.

CPC ......... *F02D 19/0694* (2013.01); *F02M 43/04* (2013.01); *F02M 2200/40* (2013.01); *F02M 2200/44* (2013.01)

(58) Field of Classification Search

CPC .. F02M 43/04; F02M 2200/44; F02M 47/027; F02M 45/086; F02D 19/0694; F02B 23/0669
USPC .......................................................... 123/304
See application file for complete search history.

(56) References Cited

U.S. PATENT DOCUMENTS

| | | | | |
|---|---|---|---|---|
| 4,499,862 | A * | 2/1985 | Baumer | F02M 43/04 123/576 |
| 9,605,635 | B2 * | 3/2017 | Park | F02D 19/0642 |
| 9,903,325 | B2 * | 2/2018 | Kalenborn | F02D 19/0689 |
| 2018/0347500 | A1 * | 12/2018 | Nooijen | F02D 19/0694 |

(Continued)

FOREIGN PATENT DOCUMENTS

| | | |
|---|---|---|
| CN | 114151252 | 3/2022 |
| DE | 102013000048 | 6/2014 |

(Continued)

OTHER PUBLICATIONS

Extended European Search Report of corresponding European Patent Application No. 25175044.4, dated Oct. 27, 2025.

*Primary Examiner* — Logan M Kraft
*Assistant Examiner* — James J Kim
(74) *Attorney, Agent, or Firm* — COZEN O'CONNOR

(57) ABSTRACT

Fuel injector for supplying fuel to a combustion chamber of a cylinder, having a first nozzle needle guided in a first nozzle guide, which interacts with first fuel injection orifices such that the first nozzle needle either opens or blocks a fuel flow of a first fuel through the first fuel injection orifices, a second nozzle needle guided in a second needle guide, which interacts with second fuel injection orifices such that the second nozzle needle, either opens or blocks a fuel flow of a second fuel through the second fuel injection orifices, a first fuel storage space for the first fuel, and a second fuel storage space for the second fuel me. The first and second fuel storage spaces are arranged next to one another in the transverse or radial direction of the fuel injector and overlap in the longitudinal or axial direction of the fuel injector.

13 Claims, 5 Drawing Sheets

(56) References Cited

U.S. PATENT DOCUMENTS

2018/0363568 A1* 12/2018 Boog ...................... F02D 19/10
2022/0205418 A1* 6/2022 Berger ................. F02M 21/026

FOREIGN PATENT DOCUMENTS

DE 102015016033 5/2017
DE 102017002983 7/2018
WO 2017162902 9/2017

* cited by examiner

FUEL INJECTOR OF AN INTERNAL COMBUSTION ENGINE AND INTERNAL COMBUSTION ENGINE

BACKGROUND OF THE INVENTION

1. Field of the Invention

The disclosure relates to a fuel injector of an internal combustion engine. Further, the disclosure relates to an internal combustion engine having at least one fuel injector.

The disclosure present here relates in particular to the field of so-called large engines or large internal combustion engines, the cylinders of which have piston diameters of at least 140 mm, in particular of at least 175 mm. Such large internal combustion engines are, for example, ships' engines. Dual-fuel internal combustion engines, as ships' engines, are already known. Dual-fuel internal combustion engines known from practice can be operated in a first operating mode, in which the same combust a first fuel, in particular a relatively ignitable fuel, and in a second operating mode, in which the same combust a second fuel, in particular a relatively less ignitable fuel. The first relatively ignitable fuel can be, for example, a diesel fuel. The second, relatively less ignitable fuel can be, for example, methanol, ethanol or ammonia. In the second operating mode, the second, relatively less ignitable fuel, in particular the methanol, ethanol or ammonia, can be ignited via the first, relatively ignitable fuel, in particular the diesel fuel.

2. Description of Related Art

DE10 2013 000 048 B3 discloses a fuel injector, with the help of which both a first, relatively ignitable fuel and also a second, relatively less ignitable fuel can be introduced into a combustion chamber of a cylinder.

SUMMARY OF THE INVENTION

Starting out from this, one aspect of the present invention is based on the object of creating a new type of fuel injector of an internal combustion engine which, with high operational stability, is simple to produce and an internal combustion engine having such a fuel injector.

The fuel injector comprises a first nozzle needle moveably guided in a first needle guide, which interacts with first fuel injection orifices in such a manner that the first nozzle needle, dependent on its position, either opens or blocks a fuel flow of the first fuel through the first fuel injection orifices. The fuel injector, further, comprises a second nozzle needle moveably guided in a second needle guide, which interacts with second fuel injection orifices in such a manner that the second nozzle needle, dependent on its position, either opens or blocks a fuel flow of a second fuel through the second fuel injection orifices. In the fuel injector, at least one first fuel storage space for the first fuel and at least one second fuel storage space for the second fuel is integrated, wherein the at least one first fuel storage space and the at least one second fuel storage space are arranged next to one another in the transverse direction or radial direction of the fuel injector and overlap one another in the longitudinal direction or axial direction of the fuel injector.

In that in the fuel injector according to one aspect of the invention the at least one first fuel storage space and the at least one second fuel storage space are arranged next to one another in the transverse direction or radial direction of the fuel injector and thus parallel to one another overlapping in the longitudinal direction or axial direction of the fuel injector, a high operational stability of the fuel injector can be ensured on the one hand, while a simple producibility of the same is ensured on the other hand. In the region of the fuel storage spaces, stresses can be reduced even with high operating pressures. It is possible to provide a desired internal pressure resistance of the fuel storage spaces by means of autofrettage, as a result of which the production costs can be further reduced.

Preferentially, the diameter of the at least one first fuel storage space is smaller than the diameter of the at least one second fuel storage space, wherein a ratio between the diameter of the second fuel storage space and the diameter of the at least one first diameter amounts to between 1.05 and 1.25. This is advantageous since the operating pressure for the first fuel is typically higher than the operating pressure for the second fuel. Thus, the diameter of the at least one first fuel storage space is smaller than the diameter of the at least one second fuel storage space. A high operational stability can be ensured.

Preferentially, a ratio between a distance between a first fuel storage space and an adjacent second fuel storage space of the fuel injector according to the invention and a distance between two adjacent second fuel storage spaces of the fuel injector according to the invention amounts to between 0.75 and 1.25, preferentially to between 0.75 and 0.95. This also serves for providing a high operational stability of the fuel injector according to the invention.

Preferentially, at least two first fuel storage spaces with different lengths are integrated in the fuel injector according to the invention, wherein a length ratio between the length of the shorter or shortest first fuel storage space and the length of the longer or longest first fuel storage space amounts to between 0.5 and 0.95, preferentially to between 0.5 and 0.75. Alternatively or additionally, at least two second fuel storage spaces with different lengths are integrated in the fuel injector, wherein a length ratio between the length of the shorter or shortest second fuel storage space and the length of the longer or longest second fuel storage space amounts to between 0.5 and 0.95, preferentially to between 0.5 and 0.75.

Through the different-length fuel storage spaces for the first fuel and/or through the different-length fuel storage spaces for the second fuel of the fuel injector according to the invention, oscillations of different wavelength are excited in the respective fuel circuit by the opening and/or closing of the respective nozzle needle, which overlap and mutually cancel one another at least partially. This also serves to increase the operational stability of the fuel injector according to the invention.

Preferred further developments of the invention are obtained from the subclaims and the following description. Exemplary embodiments of the invention are explained in more detail by way of the drawing without being restricted to this.

BRIEF DESCRIPTION OF THE DRAWINGS

There it shows.

DETAILED DESCRIPTION OF THE PRESENTLY PREFERRED EMBODIMENTS

The invention relates to a fuel injector of an internal combustion engine. Such a fuel injector is designed for supplying fuel to a combustion chamber of a cylinder of the internal combustion engine.

The fuel injector according to one aspect of the invention serves for supplying different fuels to an internal combustion engine designed in particular as dual-fuel internal combustion engine, namely in a first operating mode a first relatively ignitable fuel and in a second operating mode a second relatively less ignitable fuel, and ignite the first relatively ignitable fuel in order to ignite the second relatively less ignitable fuel via the first relatively ignitable fuel.

The first relatively ignitable fuel is in particular a diesel fuel. The second relatively less ignitable fuel can be methanol, ethanol or ammonia.

Figure 1:
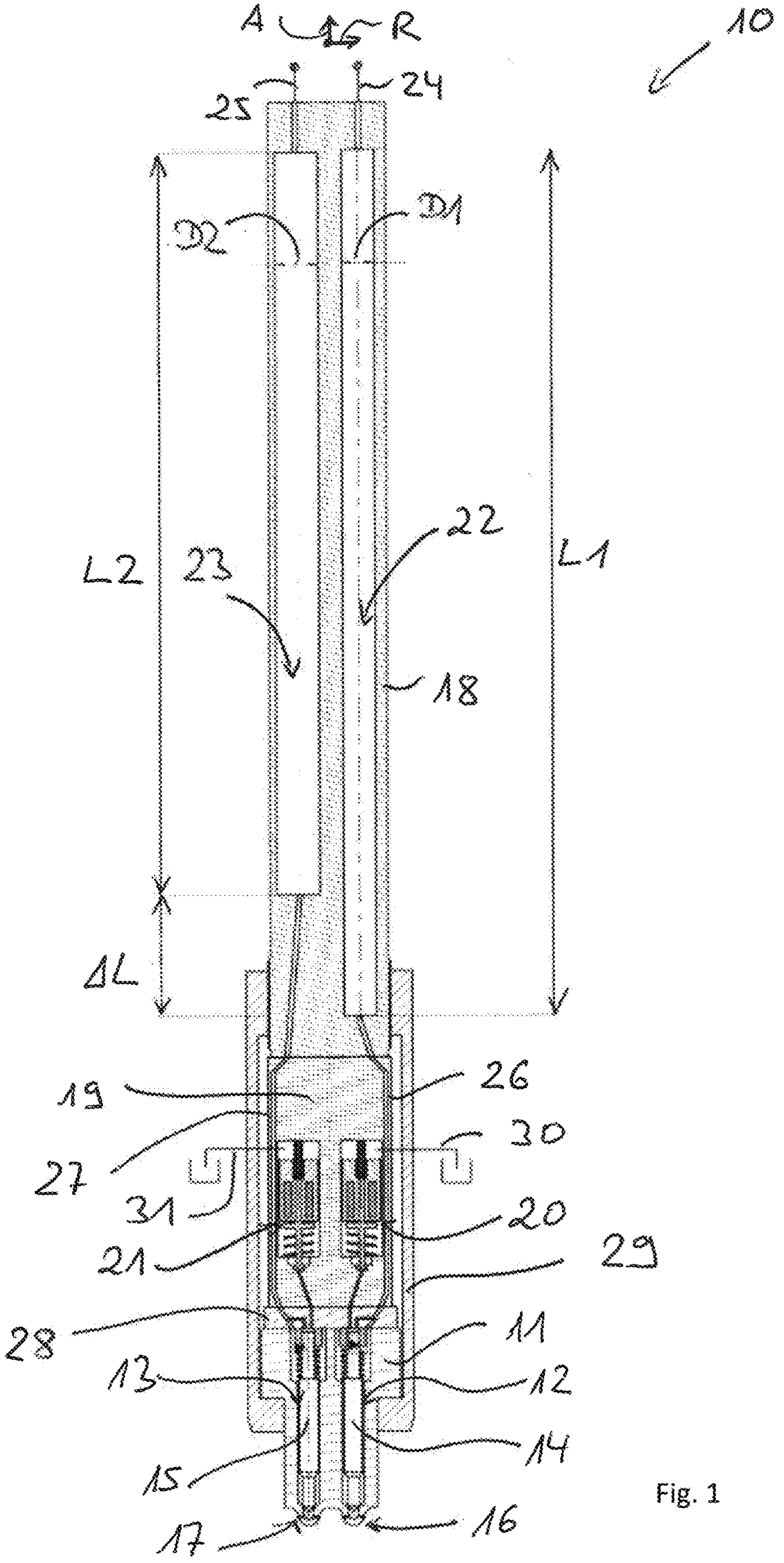
FIG. 1: is a cross-section in the longitudinal direction or axial direction through a fuel injector.

FIG. 1 shows a cross section through a first fuel injector 10 according to one aspect of the invention, wherein the fuel injector 10 comprises a nozzle needle receiving body 11, which provides a first needle guide 12 for a first nozzle needle 14 and a second needle guide 13 for a second nozzle needle 15. Further, the nozzle needle receiving body 11 provides first fuel injection orifices 16 and second fuel injection orifices 17. Dependent on the position of the nozzle needles 14, 15, the same open or block a fuel flow through the fuel injection orifices 16, 17.

The fuel injector 10 according to the invention, further, comprises a fuel storage space receiving body 18 and in the shown example a solenoid valve receiving body 19 arranged between the fuel storage space receiving body 18 and the nozzle needle receiving body 11.

A first solenoid valve 20 arranged in the solenoid valve receiving body 19 serves for controlling the first nozzle needle 14, in order to either open or block the fuel flow through the first fuel injection orifices 16 by changing the position of the first nozzle needle 14.

A second solenoid valve 21 arranged in the solenoid valve receiving body 19 serves for controlling the second nozzle needle 15 in order to change the position of the second nozzle needle 15 and, dependent thereon, either open or block the fuel flow of the second fuel through the second fuel injection orifices 17.

As already explained, the fuel injector 10 comprises the fuel storage space receiving body 18. In the fuel injector 10, namely in the fuel storage space receiving body 18 of the same, at least one first fuel storage space 22 for the first fuel and at least one second fuel storage space 23 for the second fuel is integrated.

The at least one first fuel storage space 22 is connected to a high-pressure circuit for the first fuel via a high-pressure connector 24 of the fuel injector 10, whereas the at least one second fuel storage space 23 is connected to a high-pressure circuit of the second fuel via a further high-pressure connector 25.

The at least one first fuel storage space 22 of the fuel injector 10 according to the invention is connected to the nozzle needle receiving body 11 via a first fuel line 26 and the at least one second fuel storage space 23 of the fuel injector 10 according to the invention via a second fuel line 27, wherein these fuel lines 26, 27, emanating from the fuel storage space receiving body 18, extend via the solenoid valve receiving body 19 and preferentially a plate-like intermediate body 28 arranged between the solenoid valve receiving body 19 and the nozzle needle receiving body 11 in the direction of the nozzle needle receiving body 11.

Further, FIG. 1 shows a sleeve body 29, wherein the solenoid valve receiving body 19 and the intermediate body 28 are arranged completely within the sleeve body 29 and the nozzle needle receiving body 11 and the fuel storage space receiving body 18, partially. By way of the sleeve body 29, the fuel injector 10 can be installed, for example, in a corresponding recess in a cylinder head of a cylinder of the internal combustion engine.

According to one aspect of the invention, the at least one first fuel storage space 22 for the first fuel and the at least one second fuel storage space 23 for the second fuel are arranged in the transverse direction or radial direction R of the fuel injector 10 next to one another, wherein the same overlap one another in the longitudinal direction or axial direction A of the fuel injector 10 and also run parallel to one another in the longitudinal direction or axial direction A of the fuel injector 10.

Figure 2:
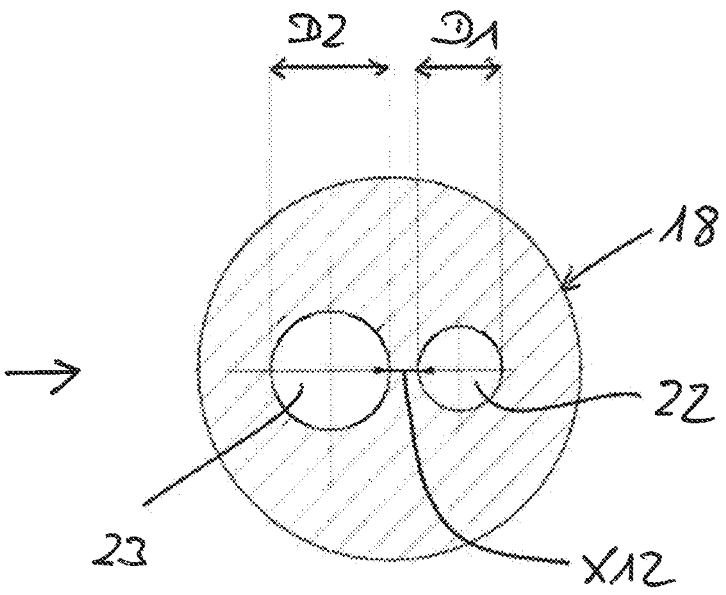
FIG. 2: is a detail of the fuel injector of FIG. 1.
Figure 3:
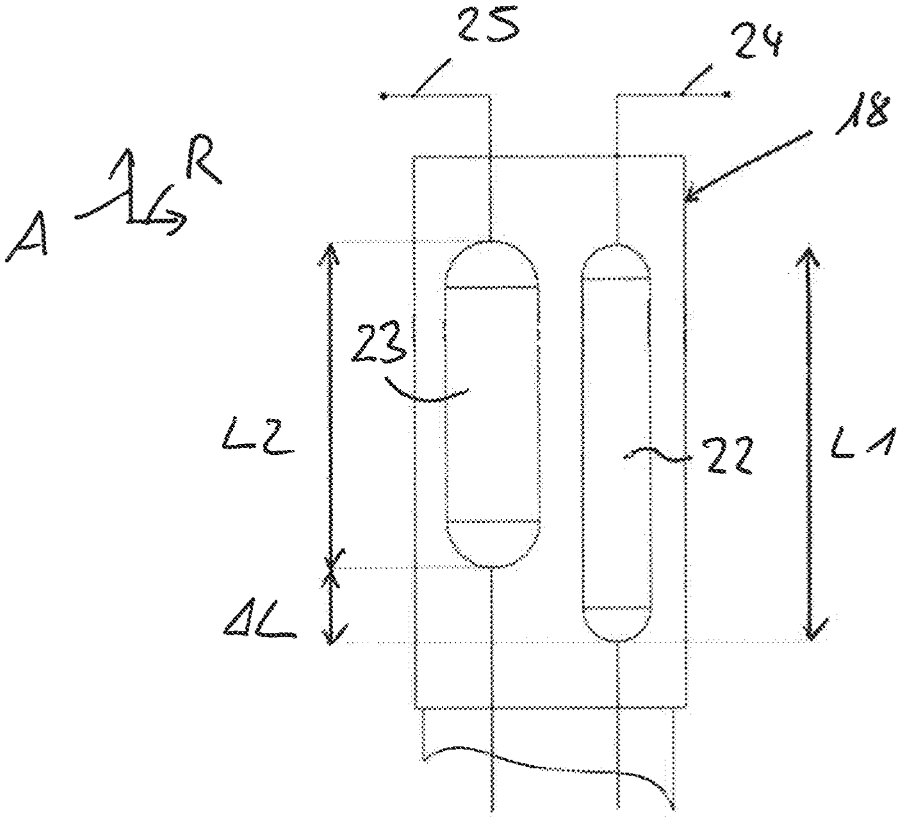
FIG. 3: is a further detail of the fuel injector of FIG. 1.

In FIGS. 1, 2, and 3, a single first fuel storage space 22 and a single second fuel storage space 23 is integrated in the fuel injector 10, namely the fuel storage space receiving body 18 of the same, wherein the diameter D1 of the first fuel storage space 22 is smaller than the diameter D2 of the second fuel storage space 23. Further, the length L1 of the first fuel storage space 22 is greater than the length L2 of the second fuel storage space 23, wherein the length difference between the two fuel storage spaces 22, 23 is shown by ΔL in FIG. 1.

In that the fuel storage spaces 22, 23 are arranged next to one another in the transverse or radial direction R, the fuel injector 10 can be easily produced while providing high operational stability. Because of the fact that fuel storage spaces 22, 23 arranged next to one another in the transverse or radial direction R have relatively small diameters D1 and D2, an area of attack for the high-pressure present in the respective fuel storage space 22, 23 is reduced, resulting in a reduction of the stresses.

Further, fuel storage spaces 22, 23 with small diameter can be worked with respect to their desired internal pressure resistance by means of autofrettage, so that no gas nitriding for providing the internal pressure resistance has to be employed. Because of this, the fuel injector 10 according to the invention is easier to produce as a whole.

Besides the high-pressure connectors 24, 25, FIG. 1 also shows low-pressure connectors 30, 31 of the fuel injector 10, namely a low-pressure connector 30 for the fuel circuit of the first fuel and a low-pressure connector 31 for the fuel circuit of the second fuel.

FIGS. 2 and 3 show details of the fuel injector 10 of FIG. 1 according to one aspect of the invention in the region of the fuel storage space receiving body 18. A single first fuel storage space 22 and a single second fuel storage space 22 is integrated in the fuel injector 10, namely in the fuel storage space receiving body 18, which according to FIG. 2 have different diameters D1 and D2. According to FIG. 2, the diameter D1 of the first fuel storage space 22 for the first fuel is smaller than the second diameter D2 of the second fuel storage space 23 for the second fuel. The second fuel storage space 23 for the second fuel has in the axial direction A, a length L2 which is smaller than the length L1 of the first fuel storage space 22 for the first fuel.

Although it is possible that the diameter D1 of the first fuel storage space 22 for the first fuel corresponds to the diameter D2 of the second fuel storage space 23 for the second fuel it is preferred that the diameter D2 of the second fuel storage space 23 for the second fuel is greater than the diameter D1 of the first fuel storage space 22 of the first fuel.

In particular it is provided that a ratio D2-D1 between the diameter D1 of the second fuel storage space 23 for the second fuel and the diameter D1 of the first fuel storage space 22 for the first fuel amounts to between 1.05 and 1.25.

Furthermore, a distance X12 between the two fuel storage spaces 22, 23 is shown in FIG. 2. This distance X12 corresponds to the wall thickness of the fuel storage space receiving body 18 between the fuel storage spaces 22, 23 arranged next to one another in the transverse direction or radial direction R.

Figure 4:
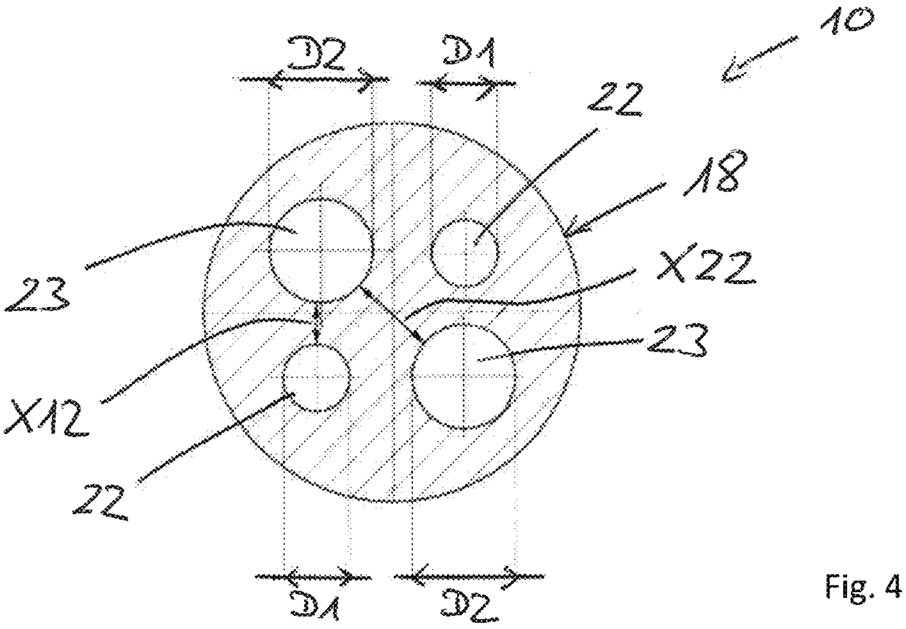
FIG. 4: is a detail of a fuel injector.
Figure 5:
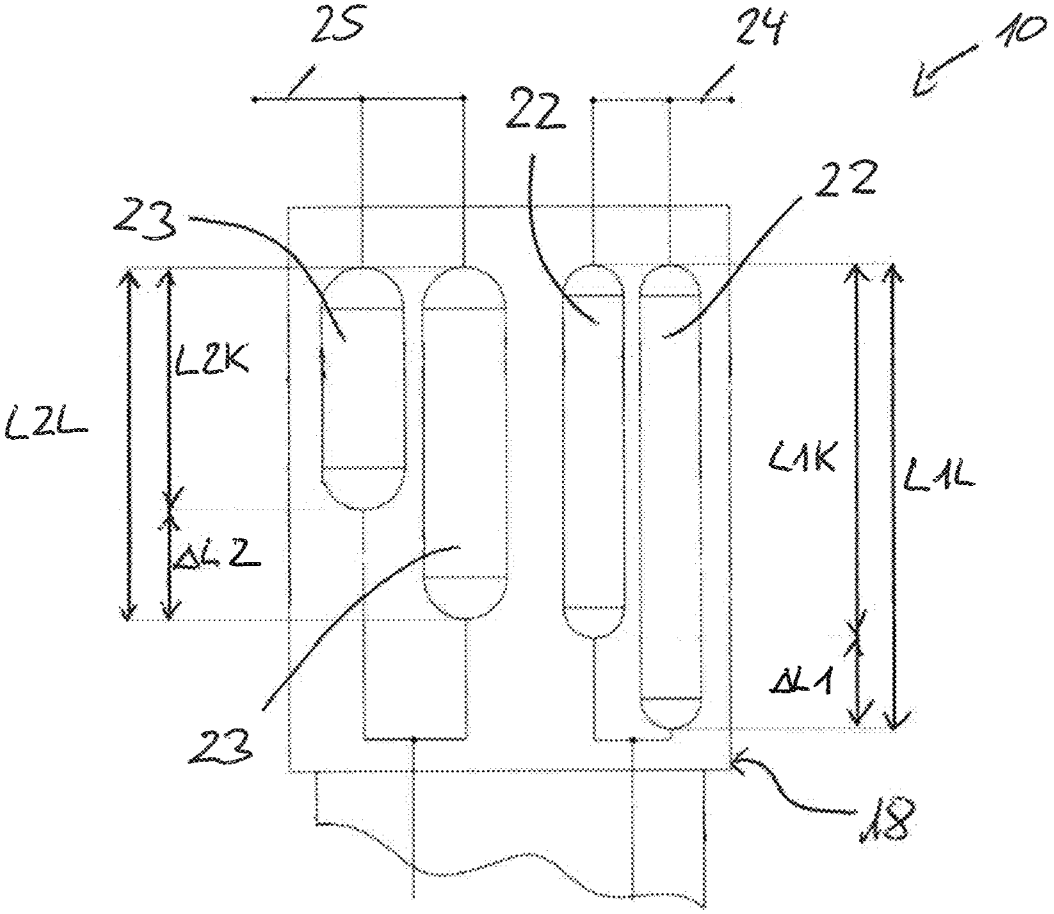
FIG. 5: is a further detail of the fuel injector of FIG. 4.

FIGS. 4 and 5 show details of a fuel injector 10 according to the invention, again in the region of the fuel storage space receiving body 18. In FIGS. 4, 5, two first fuel storage spaces 22 for the first fuel and two second fuel storage spaces 23 for the second fuel are integrated in the fuel injector 10, wherein the geometrical arrangement of these now produces altogether four fuel storage spaces 22, 23 from FIG. 4. FIG. 5 serves to illustrate the different lengths of the fuel storage spaces 22, 23.

According to FIG. 5, the fuel storage spaces 22, 23, seen in the transverse direction or radial direction R, are again arranged next to one another, wherein the two first fuel storage spaces 22 for the first fuel have an identical diameter D1, which is smaller than the identical diameter D2 of the two second fuel storage spaces 23 for the second fuel.

The fuel storage spaces 22, 23 are arranged relative to one another in such a manner that two adjacent second fuel storage spaces 23 for the second fuel have a distance X22. The distance X12 corresponds to the distance between a second fuel storage space 23 for the second fuel and an adjacent first fuel storage space 22 for the first fuel.

According to FIG. 4, the distance X22 between two adjacent second fuel storage spaces 23 for the second fuel is greater than the distance X12 between a first fuel storage space 22 for the first fuel and an adjacent second fuel storage space 23 for the second fuel, wherein a ratio X12:X22 between the distance X12 and the distance X22 amounts to between 0.75 and 0.95.

In contrast with the shown example it is also possible that the ratio X12:X22 between the distance X12 and the distance X22 amounts to between 1.05 and 1.25. Further it is possible that the distance X12 corresponds to the distance X22, wherein the ratio X12:X22 then amounts to 1.0.

As shown in FIG. 5, the two first fuel storage spaces 22 for the first fuel have different lengths, wherein the longer or longest of these two first fuel bores 22 has the length L1L and the shorter or shortest of these two first fuel storage spaces 22 has the length L1K. Likewise, the two second fuel storage spaces 23 in FIG. 5 have different lengths, wherein the shorter or shortest of the two second fuel storage spaces 23 has the length L2K and the longer or longest of the two second fuel storage spaces 23, the length L2L. The length differences are each stated by ΔL1 and ΔL2.

In particular it is provided that the length ratio L1K:L1L and/or the length ratio L2K:L2L each amounts to between 0.5 and 0.95, preferentially to between 0.5 and 0.75. Through these different lengths of the first fuel storage spaces 22 and/or through the different lengths of the second fuel storage spaces 23, pressure oscillations with different wavelength in the respective high-pressure circuit of the respective fuel can be generated in the respective high-pressure circuit of the respective fuel when opening and closing the fuel injection orifices 16 and 17 respectively via the respective nozzle needle 14 and 15 respectively, which overlap and at least partially cancel one another.

Figure 8:
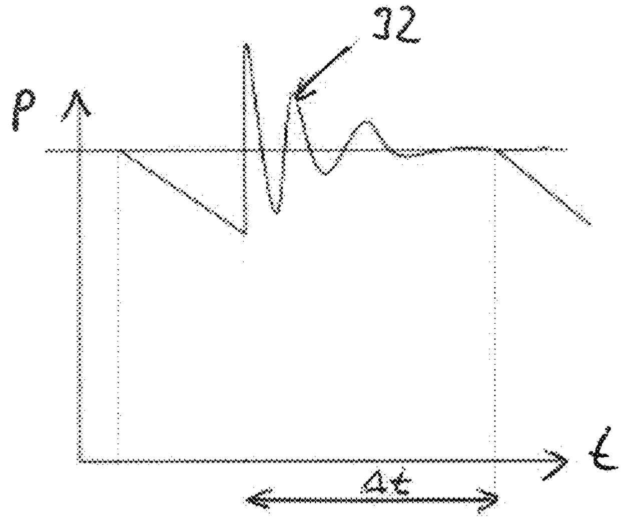
FIG. 8: is a time chart for the fuel injector of FIGS. 1, 2, 3.
Figure 9:
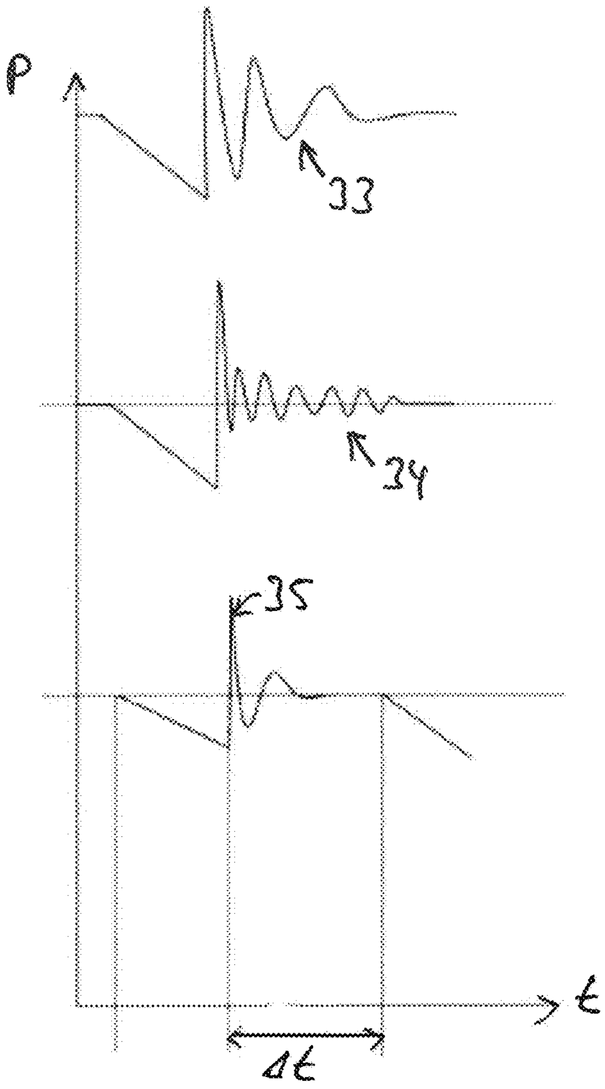
FIG. 9: is a time chart for the fuel injector of FIGS. 4, 5.

Thus, FIG. 8 shows for the fuel injector 10 of FIG. 2, 3 a time curve of a pressure oscillation 32 forming in one of the two high-pressure fuel circuits, wherein the time span Δt indicates the time in which a pressure oscillation 32 generated as a consequence of a closing operation of a nozzle needle is reduced. FIG. 9 shows over the time t three time curves of pressure oscillations 33, 34, 35, namely for the fuel injector 10 of FIG. 4, 5, wherein the pressure oscillations 33 and 34 overlap to the pressure oscillation 35. The pressure oscillations 33 and 34 cancel one another partially, so that the resulting pressure oscillation 35 of FIG. 9 decays significantly more rapidly than the pressure oscillation 32 of FIG. 8. Thus, a time span between two consecutive injection operations can be reduced.

Figure 6:
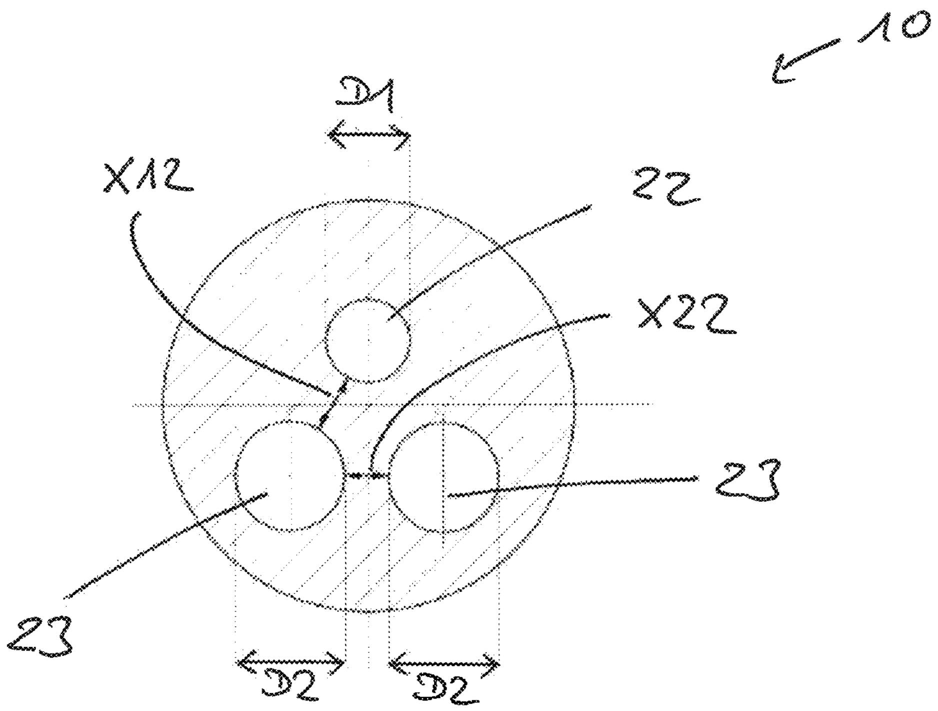
FIG. 6: is a detail of a fuel injector.
Figure 7:
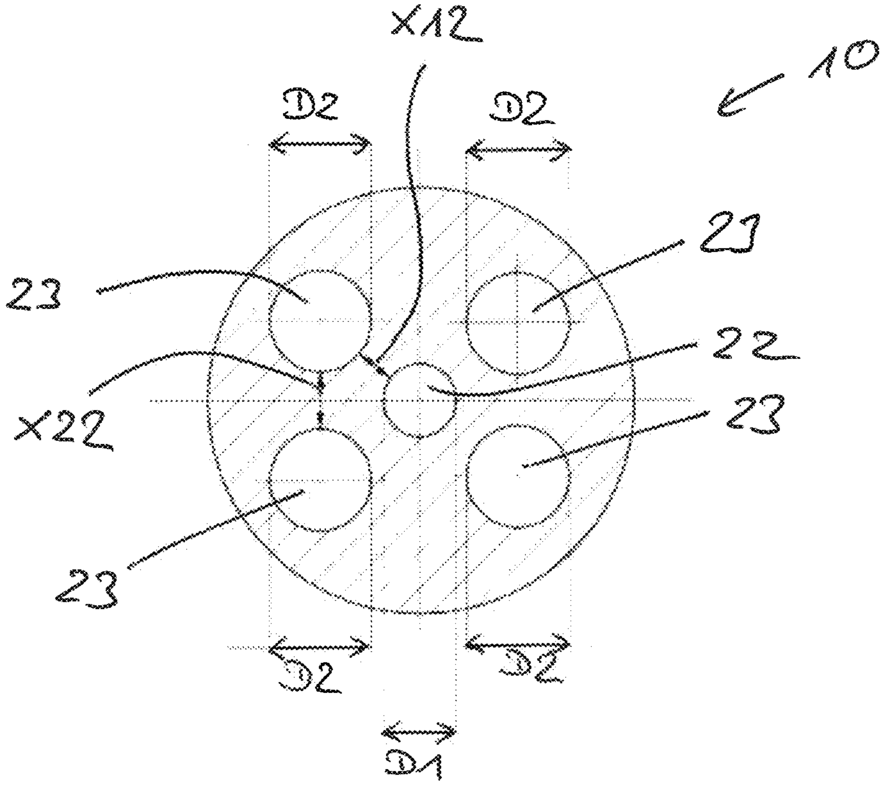
FIG. 7: is a detail of a fuel injector.

In FIGS. 1 to 5, the number of the first fuel storage spaces 22 corresponds to the number of the second fuel storage spaces 23. By contrast, FIGS. 6 and 7 show exemplary embodiments of a fuel injector 10 according to the invention, in which the number of the first fuel storage spaces 22 is smaller than the number of the second fuel storage spaces 23. Thus, two second fuel storage spaces 23 for the second fuel and a single first fuel storage space 22 for the first fuel are integrated in the fuel injector 10 in FIG. 6. In FIG. 7, four second fuel storage spaces 23 for the second fuel and a single first fuel storage space 22 for the first fuel are integrated in the fuel injector 10. FIGS. 6 and 7 in turn show the diameters D1 and D2 of the first and second fuel storage spaces 22, 23 as well as the distances X12 and X22 between them.

In FIGS. 6 and 7, the second fuel storage spaces 23 can in turn also have different lengths in order to provide overlapping and at least partially cancelling pressure waves in the high-pressure system of the second fuel.

In particular when, as shown in FIGS. 5 and 6, a single first fuel storage space 22 for the first fuel is integrated in the fuel injector 10, the same can be arranged on a longitudinal centre axis of the fuel injector 10 according to FIG. 6, wherein the second fuel storage spaces 23 for the second fuel are arranged point-symmetrically to the longitudinal centre axis of the fuel injector 10 about the first fuel storage space 22 for the first fuel. In FIG. 5, the first fuel storage space 22 for the first fuel runs out of centre or de-centrally relative to the longitudinal centre axis of the fuel injector 10. In FIG. 4, the first fuel storage spaces 22 for the first fuel and the second fuel storage spaces 23 for the second fuel are integrated out of centre or de-centrally relative to the longitudinal centre axis of the fuel injector 10, but point-symmetrically to the longitudinal centre axis of the fuel injector 10 in the same.

The first fuel is a relatively ignitable fuel, in particular a diesel fuel. The second fuel is a relatively less ignitable fuel, for example, methanol, ethanol or ammonia. In particular when in an operating mode the second, relatively less ignitable fuel, in particular the methanol, ethanol or ammonia is to be combusted, the second fuel can be ignited via the first fuel.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel injector of an internal combustion engine, configured to supply fuel to a combustion chamber of a cylinder of the internal combustion engine, comprising:

a first nozzle needle moveably guided in a first needle guide, which interacts with first fuel injection orifices such that the first nozzle needle, dependent on its position, either opens or blocks a first fuel flow of a first fuel through the first fuel injection orifices;

a second nozzle needle moveably guided in a second needle guide, which interacts with second fuel injection orifices such that the second nozzle needle, dependent on its position, either opens or blocks a second fuel flow of a second fuel through the second fuel injection orifices;

at least one first fuel storage space for the first fuel integrated in the fuel injector; and at least one second fuel storage space for the second fuel integrated in the fuel injector, wherein the at least one first fuel storage space and the at least one second fuel storage space are arranged next to one another in a transverse direction or a radial direction of the fuel injector and overlap one another in a longitudinal direction or an axial direction of the fuel injector, wherein a ratio X12:X22 between a distance (X12) between a first fuel storage space and an adjacent second fuel storage space and a distance (X22) between two adjacent second fuel storage spaces amounts to between 0.75 and 1.25.

2. The fuel injector according to claim 1, wherein a number of the first fuel storage spaces corresponds to a number of the second fuel storage spaces.

3. The fuel injector according to claim 1, wherein a number of the first fuel storage spaces is smaller than a number of the second fuel storage spaces.

4. The fuel injector according to claim 1, wherein a diameter (D1) of the at least one first fuel storage space is smaller than a diameter (D2) of the at least one second fuel storage space or corresponds to the diameter of the at least one second fuel storage space.

5. The fuel injector according to claim 4, wherein the diameter of the at least one first fuel storage space is smaller than the diameter of the at least one second fuel storage space, and wherein a ratio D2:D1 between the diameter (D2) of the respective second fuel storage space and the diameter (D1) of the respective first fuel storage space amounts to between 1.05 and 1.25.

6. The fuel injector according to claim 1, wherein the ratio X12:X22 amounts to between 0.75 and 0.95.

7. The fuel injector according to claim 1, wherein in the fuel injector at least two second fuel storage spaces with different lengths are integrated, and wherein a length ratio L2K:L2L between a length L2K of a shorter or shortest second fuel storage space and a length L2L of a longer or longest second fuel storage space amounts to between 0.5 and 0.95.

8. The fuel injector according to claim 1, further comprising a first solenoid valve configured to control the first nozzle needle; and a second solenoid valve configured to control the second nozzle needle, wherein the first and second solenoid valves are arranged in the longitudinal direction or the axial direction of the fuel injector between the fuel storage spaces and the nozzle needles.

9. The fuel injector according to claim 7, wherein the length ratio L2K:L2L amounts to between 0.5 and 0.75.

10. A fuel injector of an internal combustion engine, configured to supply fuel to a combustion chamber of a cylinder of the internal combustion engine, comprising:

a first nozzle needle moveably guided in a first needle guide, which interacts with first fuel injection orifices such that the first nozzle needle, dependent on its position, either opens or blocks a first fuel flow of a first fuel through the first fuel injection orifices;

a second nozzle needle moveably guided in a second needle guide, which interacts with second fuel injection orifices such that the second nozzle needle, dependent on its position, either opens or blocks a second fuel flow of a second fuel through the second fuel injection orifices;

at least one first fuel storage space for the first fuel integrated in the fuel injector; and at least one second fuel storage space for the second fuel integrated in the fuel injector, wherein the at least one first fuel storage space and the at least one second fuel storage space are arranged next to one another in a transverse direction or a radial direction of the fuel injector and overlap one another in a longitudinal direction or an axial direction of the fuel injector, wherein at least two first fuel storage spaces with different lengths are integrated in the fuel injector, and wherein a length ratio L1K:L1L between a length L1K of a shorter or shortest first fuel storage space and a length L1L of a longer or longest first fuel storage space amounts to between 0.5 and 0.95.

11. The fuel injector according to claim, 10 wherein the length ratio L1K:L1L amounts to between 0.5 and 0.75.

12. An internal combustion engine, having cylinders, wherein each cylinder comprises a fuel injector, comprising:

a first nozzle needle moveably guided in a first needle guide, which interacts with first fuel injection orifices such that the first nozzle needle, dependent on its position, either opens or blocks a first fuel flow of a first fuel through the first fuel injection orifices;

a second nozzle needle moveably guided in a second needle guide, which interacts with second fuel injection orifices such that the second nozzle needle, dependent on its position, either opens or blocks a second fuel flow of a second fuel through the second fuel injection orifices;

at least one first fuel storage space for the first fuel integrated in the fuel injector; and at least one second fuel storage space for the second fuel integrated in the fuel injector, wherein the at least one first fuel storage space and the at least one second fuel storage space are arranged next to one another in a transverse direction or a radial direction of the fuel injector and overlap one another in a longitudinal direction or an axial direction of the fuel injector, wherein a ratio X12:X22 between a distance (X12) between a first fuel storage space and an adjacent second fuel storage space and a distance (X22) between two adjacent second fuel storage spaces amounts to between 0.75 and 1.25.

13. An internal combustion engine, having cylinders, wherein each cylinder comprises a fuel injector, comprising:

a first nozzle needle moveably guided in a first needle guide, which interacts with first fuel injection orifices such that the first nozzle needle, dependent on its position, either opens or blocks a first fuel flow of a first fuel through the first fuel injection orifices;

a second nozzle needle moveably guided in a second needle guide, which interacts with second fuel injection orifices such that the second nozzle needle, dependent on its position, either opens or blocks a second fuel flow of a second fuel through the second fuel injection orifices;

at least one first fuel storage space for the first fuel integrated in the fuel injector; and at least one second fuel storage space for the second fuel integrated in the fuel injector, wherein the at least one first fuel storage space and the at least one second fuel storage space are arranged next to one another in a transverse direction or a radial direction of the fuel injector and overlap one another in a longitudinal direction or an axial direction of the fuel injector, wherein at least two first fuel storage spaces with different lengths are integrated in the fuel injector, and wherein a length ratio L1K:L1L between a length L1K of a shorter or shortest first fuel storage space and a length L1L of a longer or longest first fuel storage space amounts to between 0.5 and 0.95.

* * * * *